US012682627B2

(12) United States Patent
Creswell

(10) Patent No.: US 12,682,627 B2
(45) Date of Patent: Jul. 14, 2026

(54) OBJECT-BASED PREDICTION OF SCENE TRANSITIONS USING NEURAL NETWORKS

(71) Applicant: GDM Holding LLC, Mountain View, CA (US)

(72) Inventor: Antonia Phoebe Nina Creswell, London (GB)

(73) Assignee: GDM Holding LLC, Mountain View, CA (US)

( * ) Notice: Subject to any disclaimer, the term of this patent is extended or adjusted under 35 U.S.C. 154(b) by 286 days.

(21) Appl. No.: 18/263,627

(22) PCT Filed: Feb. 3, 2022

(86) PCT No.: PCT/EP2022/052636
§ 371 (c)(1),
(2) Date: Jul. 31, 2023

(87) PCT Pub. No.: WO2022/167550
PCT Pub. Date: Aug. 11, 2022

(65) Prior Publication Data
US 2024/0161318 A1      May 16, 2024

Related U.S. Application Data

(60) Provisional application No. 63/146,353, filed on Feb. 5, 2021.

(51) Int. Cl.
*G06V 10/82* (2022.01)
*G06N 3/044* (2023.01)
(Continued)

(52) U.S. Cl.
CPC ............. *G06V 10/82* (2022.01); *G06N 3/044* (2023.01); *G06N 3/0442* (2023.01); *G06N 3/045* (2023.01);
(Continued)

(58) Field of Classification Search
CPC .............. G06V 10/82; G06T 7/20–292; G06T 7/30–38; G06T 2207/20081;
(Continued)

(56) References Cited

U.S. PATENT DOCUMENTS

2022/0180133 A1*    6/2022    Antunovic ................ G06T 3/18

FOREIGN PATENT DOCUMENTS

| CN | 101904173 A | 12/2010 |
| CN | 109472795 A | 3/2019 |
| WO | WO 2020051270 A1 | 3/2020 |

OTHER PUBLICATIONS

Creswell et al., "AlignNet: Unsupervised Entity Alignment," CoRR, Jul. 21, 2020, arXiv:2007.08973v2, 20 pages (Year: 2020).*

(Continued)

*Primary Examiner* — Geoffrey E Summers
(74) *Attorney, Agent, or Firm* — Fish & Richardson P.C.

(57) ABSTRACT

Methods, computer systems, and apparatus, including computer programs encoded on computer storage media, for predicting scene transitions. A computer system receives an input sequence of images of a scene with each image corresponding to a different time point in an observation time sequence. For each time point, the system processes the corresponding image using a decomposition neural network to generate one or more feature representations. The system processes the feature representations for the time points using an alignment neural network to generate a set of aligned sequences of feature representations. The system further processes the set of aligned sequences of feature representations using a transition neural network to predict, for each of the aligned sequences of feature representations, one or more feature representations that represent predicted features of the object represented by the aligned sequence at one or more successive time points.

23 Claims, 5 Drawing Sheets

(51) Int. Cl.
*G06N 3/0442* (2023.01)
*G06N 3/045* (2023.01)
*G06T 7/246* (2017.01)

(52) U.S. Cl.
CPC .... *G06T 7/246* (2017.01); *G06T 2207/20084* (2013.01)

(58) Field of Classification Search
CPC ...... G06T 2207/20084; G06T 7/70–77; G06N 3/045; G06N 3/0455; G06N 3/044; G06N 3/0442
See application file for complete search history.

(56) References Cited

OTHER PUBLICATIONS

Vu, Tuan-Hung, et al. "Memory warps for learning long-term online video representations." arXiv preprint arXiv:1803.10861v1 (2018). (Year: 2018).*
Veerapaneni et al., "Entity Abstraction in Visual Model-Based Reinforcement Learning," CoRR, Oct. 29, 2019, arXiv:1910. 12827 19 pages. (Year: 2019).*
Burgress et al., "Monet: Unsupervised scene decomposition and representation," CoRR, Jan. 22, 2019, arXiv:1901.11390, 22 pages.
Cabi et al., "Scaling data-driven robotics with reward sketching and batch reinforcement learning," CoRR, Sep. 26, 2019, arxiv.org/abs/1909.12200, 11 pages.
Creswell et al., "AlighNet: Unsupervised Entity Alignment," CoRR, Jul. 21, 2020, arXiv:2007.08973v2, 20 pages.
Dai et al., "Transformer-XL: Attentive language models beyond a fixed-length context," CoRR, Jan. 9, 2019, arXiv:1901.02860, 20 pages.
Garnelo et al., "Reconciling deep learning with symbolic artificial intelligence: representing objects and relations," Current Opinion in Behavioral Sciences, Oct. 2019, 29:17-23.
Garnelo et al., "Towards deep symbolic reinforcement learning," CoRR, Sep. 18, 2016, arXiv:1609.05518, 13 pages.
Graves et al., "A novel connectionist system for unconstrained handwriting recognition," IEEE transactions on pattern analysis and machine intelligence, May 2009, 31(5):855-868.
Greff et al., "Multi-object representation learning with iterative variational inference," CORR, Mar. 1, 2019, arXiv:1903.00450, 28 pages.
Greff et al., "Tagger: Deep unsupervised perceptual grouping," Advances in Neural Information Processing Systems 29, 2016, pp. 4484-4492.
Ha et al., "World models," CoRR, Mar. 27, 2018, arXiv:1803. 10122, 21 pages.
Hafner et al., "Dream to control: Learning behaviors by latent imagination," CoRR, Dec. 3, 2019, arXiv:1912.01603, 20 pages.
He et al., "Tracking by animation: Unsupervised learning of multi-object attentive trackers," CoRR, Sep. 10, 2018, arXiv:1809.03137, 13 pages.
Hill et al., "Environmental drivers of systematicity and generalization in a situated agent," CoRR, Oct. 1, 2019, arxiv.org/abs/1910. 00571, 15 pages.

Hill et al., "Human instruction-following with deep reinforcement learning via transfer-learning from text," CoRR, May 19, 2020, arXiv:2005.09382, 19 pages.
Hsieh et al., "Learning to decompose and disentangle representations for video prediction," Advances in Neural Information Processing Systems 31, 2018, pp. 517-526.
Hubert et al., "Comparing partitions," Journal of classification, Dec. 1985, 2(1):193-218.
International Preliminary Report on Patentability in International Appln. No. PCT/EP2022/052636, dated Aug. 17, 2023, 10 pages.
International Search Rpeort and Written Opinion in International Appln. No. PCT/EP2022/052636, dated Jul. 11, 2022, 15 pages.
Kipf et al., "Contrastive learning of structured world models," CoRR, Nov. 27, 2019, arXiv:1911.12247, 21 pages.
Kosiorek et al., "Sequential attend, infer, repeat; Generative modelling of moving objects," Advances in Neural Information Processing Systems 31, 20148, pp. 8606-8616.
Lake et al., "Building machines that learn and think like people," Behavioral and Brain Sciences, Nov. 24, 2016, 40:e253.
Löwe et al., "Learning object-centric video models by contrasting sets," CoRR, Nov. 20, 2020, arXiv:2011.10287, 11 pages.
Pylyshyn, "The role of location indexes in spatial perception: A sketch of the finst spatial-index model," Cognition, Jun. 1989, 32(1):65-97.
Racanière et al., "Imagination-augmented agents for deep reinforcement learning," Advances in Neural Information Processing Systems 30, 2017, pp. 5690-5701.
Rand, "Objective criteria for the evaluation of clustering methods," Journal of the American Statistical association, Apr. 5, 2012, 66(336):846-850.
Ronneberger et al., "U-net: Convolutional networks for biomedical image segmentation," International Conference on Medical image computing and computer-assisted intervention, Nov. 18, 2015, pp. 234-241.
Shanahan et al., "Artificial intelligence and the common sense of animals," Trends in Cognitive Sciences, Oct. 8, 2020, 24(11):862-872.
Silver et al., "Mastering the game of Go with deep neural networks and tree search," Nature, 2016, 529(7587):484-489.
Steenkiste et al., "Relational neural expectation maximization: Unsupervised discovery of objects and their interactions," CoRR, Feb. 28, 2018, arXiv:1802.10353, 15 pages.
Vaswani et al., "Attention Is All You Need," CoRR, Dec. 6, 2017, arXiv:1706.03762, 15 pages.
Veerapaneni et al., "Entity Abstraction in Visual Model-Based Reinforcement Learning," CoRR, Oct. 29, 2019, arXiv:1910.12827, 19 pages.
Wang et al., "Non-local neural networks," Proceedings of the IEEE Conference on Computer Vision and Pattern Recognition, 2018, pp. 7794-7803.
Watters et al., "Cobra: Data-efficient model-based RL through unsupervised object discovery and curiosity driven exploration," CoRR, May 22, 2019, arxiv.org/abs/1905.09275, 24 pages.
Weis et al., "Unmasking the inductive biases of unsupervised object representations for video sequences," CoRR, Jun. 12, 2020, arXiv:2006. 07034v1, 32 pages.
Zaheer et al., "Deep sets," Advances in neural information processing systems 30, 2017, pp. 3391-3401.
Office Action in Chinese Appln. No. 202280013440.3, mailed on Dec. 26, 2025, 9 pages (with English translation).

* cited by examiner

OBJECT-BASED PREDICTION OF SCENE TRANSITIONS USING NEURAL NETWORKS

CROSS-REFERENCE TO RELATED APPLICATIONS

This application is a § 371 National Stage of International Application No. PCT/EP2022/052636, filed Feb. 3, 2022, which claims priority to U.S. Provisional Patent Application No. 63/146,353, on Feb. 5, 2021, the disclosures of which are hereby incorporated by reference in their entireties.

BACKGROUND

This specification relates to processing image observation sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes methods, computer systems, and apparatus, including computer programs encoded on computer storage media, for making object-based predictions of scene transitions using neural networks.

In one innovative aspect, this specification describes a method for predicting scene transitions. The method is implemented by a system including one or more computers. The system receives an input sequence of images of a scene with each image corresponding to a different time point in an observation time sequence. For each time point, the system processes the corresponding image using a decomposition neural network to generate one or more feature representations. Each feature representation represents one of a set of objects that appears in the corresponding image. The system processes the feature representations for the time points using an alignment neural network to generate a set of aligned sequences of feature representations. Each aligned sequence of feature representations represents the same object across the different time points in the observation time sequence. The system further processes the set of aligned sequences of feature representations using a transition neural network to predict, for each of the aligned sequences of feature representations, one or more feature representations that represent predicted features of the object represented by the aligned sequence at one or more successive time points.

In implementations the method may be considered a form of object tracking method. More particularly, the method is able to track multiple objects, in implementations even when they temporarily disappear from view, and produce a set of feature representations each characterizing one of the objects and in which each feature representation consistently represents the same object over time. The feature representation may characterize an object in terms of its position or motion and/or other characteristics such as size, shape and color. Moreover the method is able to extrapolate, i.e. to use the input sequence to predict feature representations at time points after the observation time sequence. The predicted features of the tracked objects may be used in many ways.

Merely as one example the predicted features can be used to control a mechanical agent, such as a robot, operating in a real-world environment to perform a real-world task. Then the images may be images of the environment. This can enable the agent to plan over a future trajectory in object representation space, e.g. to characterize a robot arm and how it interacts with physical objects in its environment. Some implementations of the method also process actual or planned actions taken by the agent to predict the features of each object, as the scene may change as the agent moves either because part of the agent is included in the scene or because a viewpoint of the scene is associated with a position or configuration of the agent. As another example the predicted features may be used to generate a corresponding predicted scene.

Implementations of the method address a problem of making predictions in an unstructured representation space. Thus implementations of the method decompose the images into representations of each of a set of objects in a scene, and then align these so that the representations are consistent over time. Then a transition model is applied to these consistent, object-based representations to predict the future object features. Structuring the system in this way, irrespective of details of the individual neural networks, facilitates learning the transition model, i.e. training the transition neural network, to produce accurate predictions.

It is also useful to be able to train the system in an unsupervised manner. However it would seem essential that labelled objects would be needed in order to train the system to predict object features such as object position, motion, or other characteristics. Nonetheless implementations of the system enable a method for unsupervised training of the system. Thus the system can be trained, unsupervised, using a joint loss that combines a decomposition loss (relating to the decomposition neural network), an alignment loss (relating to the alignment neural network), and a transition loss (relating to the transition neural network). The system may be trained end-to-end using a sum of these losses. Composing the loss in this way allows the decomposition loss to be unsupervised, configured for learning to generate the object feature representations for objects in an image. Then the alignment loss and the transition loss can also be unsupervised, configured for learning to link the feature representations over time by computing a loss between the feature representation at a time and the predicted feature representation for the time, i.e. based on historical feature representations and current feature representations.

In some implementations of the method, the set of aligned sequences of feature representations are respectively stored in a set of slots in a slot-based memory. A slot may be a memory location configured to store a feature representation. This can facilitate maintaining consistent object identities and, in implementations, object persistence, although it is not essential. In some implementations the transition neural network can include memory, as described later.

The alignment network can predict an alignment output that defines an assignment for assigning current feature representations at a current time point to each of the set of slots in the slot-based memory. For example, the alignment output can include an adjacency matrix for performing alignment of the current feature representation with the set of slots in the slot-based memory.

In some implementations of the method, the system can perform a hard alignment by generating a permutation matrix based on the current feature representation and the adjacency matrix. For example, the hard alignment is performed using a Hungarian algorithm. The set of aligned sequences of feature representations can be generated by performing the hard alignment on the feature representations generated from the input sequence of images.

As previously described, in some implementations of the method, the decomposition neural network, the alignment neural network, and the transition neural network have been jointly trained to minimize a joint loss.

The joint loss can include an unsupervised decomposition loss measuring a difference between an input image and a reconstructed image reconstructed by a decoder of the decomposition neural network, reconstructed based on object (segmentation) masks for the objects. An object (segmentation) mask for an object may have pixels that represent whether the pixel belongs to the object; it may be a hard mask (e.g. pixel values of 1 or 0) or a soft, probabilistic mask.

The unsupervised alignment loss can include a reconstruction loss that measures a difference between an output of the transition neural network for the current time point based on aligned historical feature representations and aligned current feature representations generated by applying the adjacency matrix to a set of current feature representations. The set of aligned current feature representations can be generated by performing a soft alignment that multiplies the adjacency matrix with current feature representations.

The unsupervised alignment loss can further include a measurement of an entropy of the alignment output.

The unsupervised alignment loss can further include a measurement that penalizes columns of the adjacency matrix that sum to more than one.

The joint loss can include a transition loss measuring a difference between an output of the transition neural network for a current time point based on aligned historical feature representations and aligned current feature representations outputted by the alignment neural network.

In some implementations of the method, an environment corresponding to the scene is being interacted with by an agent. The input sequence of images of the scene can be obtained by the agent.

In some implementations of the method, to process the set of aligned sequences of feature representations, the system generates aligned feature representations at a next time point by applying the transition neural network on (i) the set of aligned sequences of feature representations generated from the input sequence of images and (ii) one or more actions taken by the agent after the last time point in the observation time sequence.

In some implementations of the method, the transition neural network includes a recurrent neural network (RNN). To process the set of aligned sequences of feature representations, for each aligned sequence of feature representations, the system processes, using the RNN, an RNN input derived based on the aligned sequence of feature representations, the one or more actions taken by the agent, and a hidden state, to generate an update. For a successive time point after the current time point, the system generates a predicted feature representation for the successive time point by applying the update (which may represent a feature representation change) to the feature representation for the current time point.

In some implementations, wherein the RNN is a long short-term memory (LSTM) network applied independently to each slot and sharing weights between slots.

In some implementations of the method, the transition neural network further includes a transformer network, wherein the transformer network is configured to process the set of aligned sequences to generate a set of encoded aligned sequences of feature representations that encode interaction among the set of objects. The RNN input includes the set of encoded aligned feature representations.

In some implementations of the method, the system further controls the agent according to at least an output of the transition neural network, e.g. by providing control signals for the agent from a controller that receives the output.

This specification also provides a system including one or more computers and one or more storage devices storing instructions that when executed by the one or more computers, cause the one or more computers to perform the scene transition prediction method above.

This specification also provides one or more computer storage media storing instructions that when executed by one or more computers, cause the one or more computers to perform the scene transition prediction method described above.

The subject matter described in this specification can be implemented in particular embodiments so as to realize one or more of the following advantages.

The system described in this specification generates a prediction of scene transitions at the level of objects, by predicting feature representations at an object level. Working in an object-structured representation space improves learning efficiency and accuracy, not only because the representation space is lower-dimensional than pixel space, but also because the model can exploit the fact that objects move as a whole, which simplifies the dynamics it is required to learn. The system further performs an alignment at the object level, and thus further improves the accuracy of the transition prediction at the object level, and enables the system to model object persistence when a given object is temporarily occluded or temporarily moves out of the field of view. In addition, the system includes a model that can be trained end-to-end in an unsupervised manner. This enables the system to learn effectively in the absence of labels and track objects across time in the environment, a scenario that is common in real-world tasks such as robotics, where agents only have access to the sensor readings, such as images of the environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
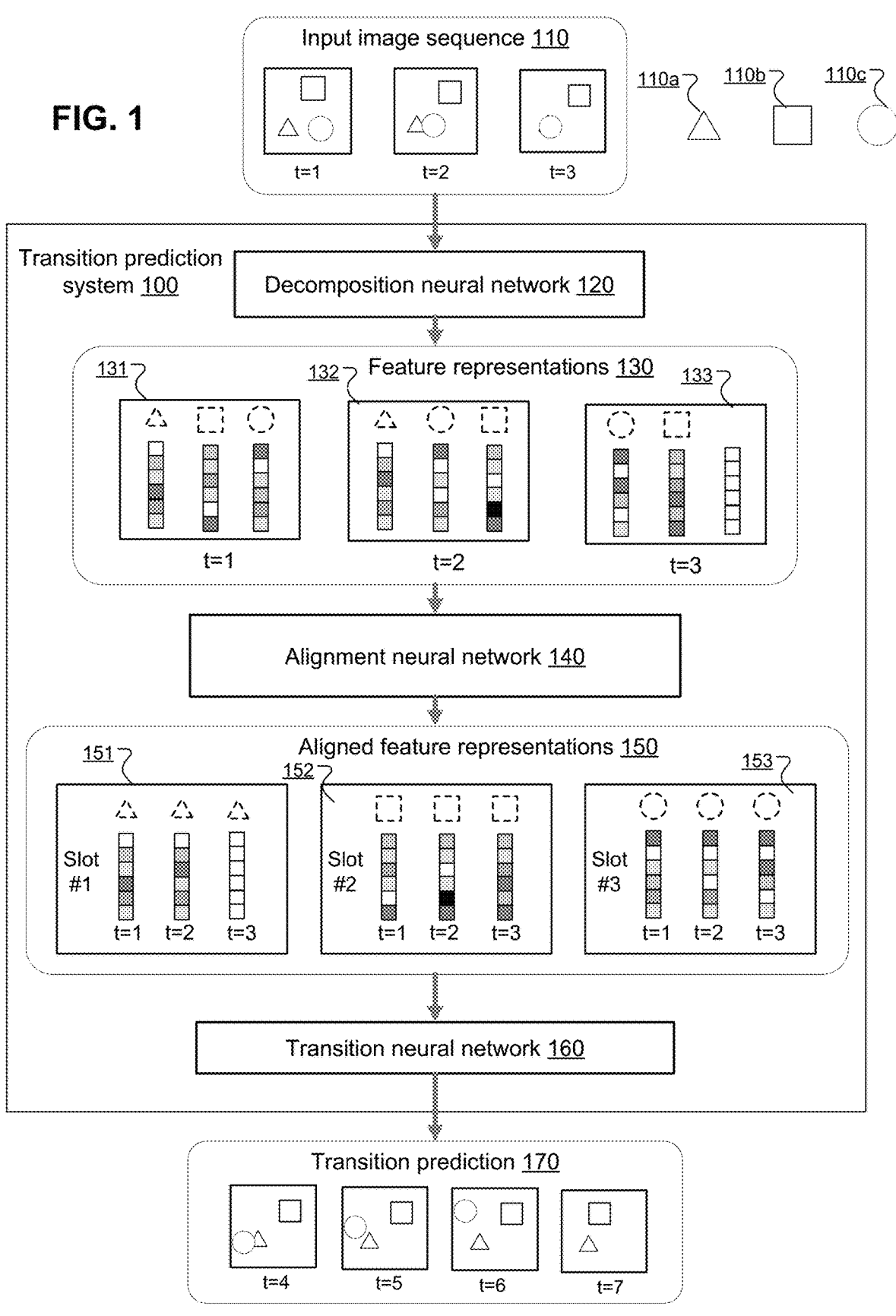
FIG. 1 shows an example of a transition prediction system.

FIG. 1 shows an example of scene transition prediction system 100. The system 100 is an example of a system implemented as computer programs on one or more computers in one or more locations, in which the systems, components, and techniques described below can be implemented.

In general, the system 100 receives an input sequence 110 of images of a scene. Each image in the input sequence corresponds to a different time point (e.g., t=1, t=2, or t=3) in an observation time sequence. The system 100 processes the input sequence 110 of images to generate a transition prediction 170 that includes predictions of the scene at one or more future time points (e.g., t=4, 5, 6, 7).

In some implementations, the input sequence of images 110 depicts the scene of an environment, for example, of a real-world environment. The images can be obtained from an image sensor such as a camera or LIDAR sensor, and an image in the sequence can be a two-dimensional RGB or grayscale image, or can include a point cloud.

One or more of the sequence of images can depict one or more objects, such as the objects 110*a*, 110*b*, and 110*c*. Objects depicted by a given image can include dynamic objects, static objects, or both. Dynamic objects can include objects that move in the environment on their own, and include, e.g., vehicles, cyclists, pedestrians, robots, or animals. Dynamic objects can also include objects with which an agent in the environment interact, such as objects and parts that a robotic agent moves, maneuvers, or operates on. Static objects can include trees and other vegetation, signage, machinery, and so on.

In general, the scene can be a dynamic scene that changes across different time points. The dynamics of the scene can be caused by one or more moving objects in the environment and/or a moving sensor that collects the input sequence of images.

In some implementations, the environment can be a fully observable environment in which all of the objects are observable by the image sensor at all of the time points. In some other implementations, the environment can be a partially observable environment for one or more of the time points. An object that is detected at one time point may not be detected at another time point, for example, because the object is not in the field of view of the image sensor at the other time point, or because the object is occluded by another object at the other time point. For example, the object 110*a* may be occluded by the object 110*c* at time point t=3.

In some implementations, the environment is being interacted with by an agent. As an example, the sequence of images can be images captured by an image sensor of a mechanical agent, e.g., a robot or an autonomous vehicle, e.g. navigating through the environment, e.g. the real-world environment, over time to complete a specified task, e.g., to reach a specified location in the environment, to move an object to a specified location in an environment, or to locate a specified object in the environment.

As another example, the sequence of images can be images captured by an image sensor located in the environment, external to any agents navigating through the environment, e.g., mounted or otherwise statically positioned at a given location in the environment.

Broadly the goal of the system 100 is to accurately predict, based at least on the input sequence 110 of image observations, scene transitions (e.g., the changes in the image observations) for future time points. To achieve this goal, the system 100 uses an object-based approach to characterize the dynamics of each object detected in the scene, and to predict the respective transition of each object in the future time points.

For each time point, the system 100 processes the corresponding image using a decomposition neural network 120 to generate one or more feature representations 130. Each feature representation represents one of a set of objects (e.g., object 110*a*, 110*b*, or 110*c*) detected in the corresponding image.

In this specification, a feature representation is an ordered collection of numeric values, e.g., a vector of floating-point or other numeric values, that has been determined to represent an entity, e.g., an object detected in the corresponding image. The feature representation can characterize one or more properties of the object, such as size, shape, color, texture, position (e.g. in each dimension), and motion. For example in some implementations the feature vector may encode an object (segmentation) mask. In general, the feature representation has a lower dimensionality than the image pixel space, thus facilitating the characterization and the tracking of the object.

In some implementations, the decomposition neural network 120 can have been trained through unsupervised learning. That is, the network parameters of the decomposition neural network can be determined based on unlabeled images, e.g., images without ground-truth segmentation masks of detected objects.

Any of a variety of scene decomposition neural networks that have been trained through unsupervised learning can be used. One example of such a scene decomposition neural network is described in "Monet: Unsupervised scene decomposition and representation," Burgess, et al., arXiv preprint arXiv: 1901.11390, 2019.

Another example of such a scene decomposition neural network is described in "Multi-object representation learning with iterative variational inference," Greff, et al., arXiv preprint arXiv: 1903.00450, 2019. More generally, there are many neural networks that can be used to generate object segmentation masks for objects in an image frame, and additional object features may be generated by applying each of these to the image frame.

For each image in the sequence of images, the system 100 can use the decomposition neural network 120 to decompose the image into regions that each depicts a different object, and generate a respective feature representation for each object. That is, the system can use the decomposition neural network to decompose a first image (e.g., corresponding to a first time point t=1) in the sequence into a first set of regions respectively depicting a first set of objects, a second image (e.g., corresponding to a second time point t=2) in the sequence into a second set of regions respectively depicting a second set of objects, a third image (e.g., corresponding to a third time point t=3) into a third set of regions respectively depicting a third set of objects, and so on.

However, the sets of objects are not aligned across time, i.e., the system does not have access to information indicating which objects at a current time point (e.g., at t=3) match, i.e., are the same objects as, other objects that have already been detected at other time points (e.g., at t=1 and t=2).

As a particular example, each set of regions corresponding to the detected objects can be arranged in an order from left to right. However, there is not necessarily any correspondence between the objects in a given position in the order among different sets. As a result, the feature representations 130 outputted by the decomposition neural network 120 are not aligned across time. For example, as shown in FIG. 1, for the feature representations 131 at t=1, the detected objects represented by the features are ordered from left to right as 110*a*, 110*b*, and 110*c*. For the feature representations 132 at t=2, the detected objects represented by the features are ordered from left to right are 110*a*, 110*c*, and 110*b*. For the feature representations 132 at t=3, the detected objects represented by the features are 110*c* and 110*b*, while 110*a* is invisible (hidden behind 110*c*). That is, the detected objects corresponding to the feature representations 131, 132, and 133 are arranged in different orders from left to right in the corresponding image. The output from the decomposition neural network 120 does not include information that specifies, for a given feature representation for a current point, which feature representation for any earlier time points correspond the same object as the given feature representation.

In some cases, the system uses the decomposition neural network 120 to decompose each image into the same number (e.g., K) of regions. The system associates any region that does not depict an object, i.e., in which no object has been detected, with a placeholder feature representation that indicates that no object was detected in the corresponding region. In other words, the set of objects that are detected at any given time point can include one or more placeholder objects that have a feature representation that indicates that no object was detected in the corresponding region. For example, the feature representations 133 include a placeholder feature representation since only two objects have been detected in the corresponding image at t=3.

The system 100 processes the feature representations 130 for the time points using an alignment neural network 140 to generate a set of aligned sequences of feature representations 150. Each aligned sequence of feature representations, e.g., the sequence 151, 152, or 153 represents a same object across the different time points in the observation time sequence.

In general, at each particular time point in the sequence after the first time point, the system 100 can use the alignment neural network 140 to process the feature representations 130 of the set of objects detected at the particular time point to predict, for each given object in the set of objects detected at the particular time point, which object that has been detected at one or more earlier time points is the same object as the given object.

In some implementations, the system assigns the set of aligned sequences of feature representations 150 respectively to a set of slots in a slot-based memory, i.e., a memory that has a plurality of "slots" and that stores data for each of the slots.

In some implementations, the alignment network predicts an alignment output that indicates an assignment for assigning current feature representations to each of the set of slots in the slot-based memory. Thus, the system 100 can assign, according to the alignment output, each unique object that has been detected at any of the time points to a different one of the slots in the slot-based memory, and stores the feature representations of the same object detected at different time points in the same slot to which the same object has been assigned to.

In some implementations, the alignment neural network 140 can have been trained through unsupervised learning. Any of a variety of alignment neural networks that have been trained through unsupervised learning can be used.

One example of such an alignment neural network is described in "Alignnet: Unsupervised entity alignment," Creswell, et al., arXiv preprint arXiv: 2007.08973, 2020.

In some implementations, the system can use the alignment neural network 140 to predict an adjacency matrix $A_t$ ∈ $\mathfrak{R}^{M \times K}$ at the current time point t, where M is the number of memory slots and K is the number of feature representations for each time point, with M≥K, for performing alignment of the current feature representation with the set of slots in the slot-based memory. The system 100 can apply the adjacency matrix $A_t$ to the (stacked) feature representation vectors $z_t$ ∈ $\mathfrak{R}^{K \times F}$ generated by the decomposition neural network 120 for the current time point, where F is the dimension of each feature vector, to generate aligned object representations, $$z_t^a \in \mathfrak{R}^{M \times F}.$$

The elements of the adjacency matrix $A_t$ can include respective alignment scores for aligning the feature representations at the current time point t. The system 100 can perform a soft alignment, e.g., by computing $z^{a,soft}$ using $z^a \triangleq z^{a,soft} = A_t z_t$ or by applying another differentiable algorithm to compute a respective probability distribution over the objects at the current time point for each memory slot. The system 100 can use the aligned object representations computed by the soft alignment $z^{a,soft}$ during training of the alignment neural network 140.

After training, the system 100 can perform a hard alignment that assigns a different memory slot to each current object, e.g., by computing $z^a \triangleq z^{a, \ hard} =$ Hungarian $(A_t)z_t$, where Hungarian(.) denotes the application of the Hungarian algorithm, a non-differentiable algorithm which computes a permutation matrix given the adjacency matrix.

The hard aligned feature representations $z^{a, \ hard}$ can be used in subsequent steps for performing predations of future transition of the objects.

The system 100 processes the set of aligned sequences of feature representations 150 using a transition neural network 160 to predict, for each of the aligned sequences of feature representations (e.g., sequence 151, 152, or 153), one or more feature representations that represent predicted features of the object represented by the aligned sequence at one or more successive time points.

In some cases, the agent interacting with the environment can be controlled to perform certain actions. One or more of the actions can affect the objects in the scene, such as moving the objects, or affect the viewing of the objects, such as a "head turn" (i.e. a change in image sensor gaze direction) leading to objects moving in and out of view. The system 100 can apply the transition neural network 160 on (i) the set of aligned sequences of feature representations generated from the input sequence of images and (ii) data identifying one or more actions taken (or to be taken) by the agent.

The system 100 can use the transition neural network to perform the prediction in both an encoding and an unrolling phase. During the encoding phase, the system uses the transition neural network to process the aligned feature representations (and optionally an agent action) at a given time point (e.g., t=1) to predict aligned object feature representations at the next time point (e.g., t=2). During the unrolling phase, the system uses the transition neural network to process the predicted object feature representations (and optionally an agent action) at a given time point (e.g., t=4) to predict aligned object feature representations at the next time point (e.g., t=5). Thus, the system can predict the object feature representations at multiple time points (e.g., t=4, 5, 6, 7, etc.) beyond the last observation time point of the input image sequence.

In some implementations, the transition neural network 160 includes a recurrent neural network (RNN).

A recurrent neural network is a neural network that includes one or more recurrent neural network layers, e.g., long short-term memory (LSTM) neural network layers or gated recurrent unit (GRU) neural network layers, and, optionally, one or more other types of layers, e.g., one or more of self-attention layers, fully-connected layers, convolutional layers, and so on.

For each aligned sequence of feature representations (e.g., sequence 151, 152, or 153), the system processes, using the RNN, an RNN input derived from the aligned sequence of feature representations, optionally the one or more actions taken by the agent, and a hidden state (i.e., an internal state of the RNN), to generate an update as the output of the RNN. The system also updates the internal state of the RNN as part of generating the output for a given time point. For a successive time point after the current time point, the system generates a predicted feature representation for the successive time point by applying the update to the feature representation for the current time point.

In some implementations, the system 100 uses the RNN to independently process the aligned feature sequence stored in each memory slot. That is, the system applies a set of slot-specific RNNs independently to the set of respective plurality of object slots. Each slot-specific RNN can be an RNN with the same architecture, but with an independent internal state. Thus, the system can maintain a separate internal state for each of the slots in the slot-based memory and, for each particular slot, can process the current feature representation of the object assigned to the slot and the internal state for the particular slot to generate an update to the feature representation and to update the internal state for the particular slot. In some implementations, each slot-specific RNN can share the same set of network parameters. For example, the set of slot-specific RNNs can be a set of slot-specific LSTM networks, and the system applies the LSTM network independently to each object slot and shares the network parameters of the LSTM between different slots.

In some implementations, before the RNN, the transition neural network 160 further includes a transformer network. In general a transformer network may be a neural network characterized by having a succession of self-attention neural network layers. A self-attention neural network layer has an attention layer input for each element of the input and is configured to apply an attention mechanism over the attention layer input to generate an attention layer output for each element of the input. There are many different attention mechanisms that may be used.

In each given time point in a plurality of time points, the transformer network is configured to process the set of aligned object features stored in the memory slots at the given time point to generate a set of encoded aligned object features for the given time point. The set of encoded aligned object features are also aligned with the set of memory slots. Each encoded aligned object feature corresponds to one of the set of aligned object features and encodes the corresponding aligned object feature with the object's interactions with the other objects in the set. The system then uses the slot-specific RNNs to process the respective encoded aligned object features to predict the feature representations for future time points. This process allows the system to capture interactions of a given object with other objects (via the transformer) and integrate that interaction information over time (via the RNN).

Figure 2:
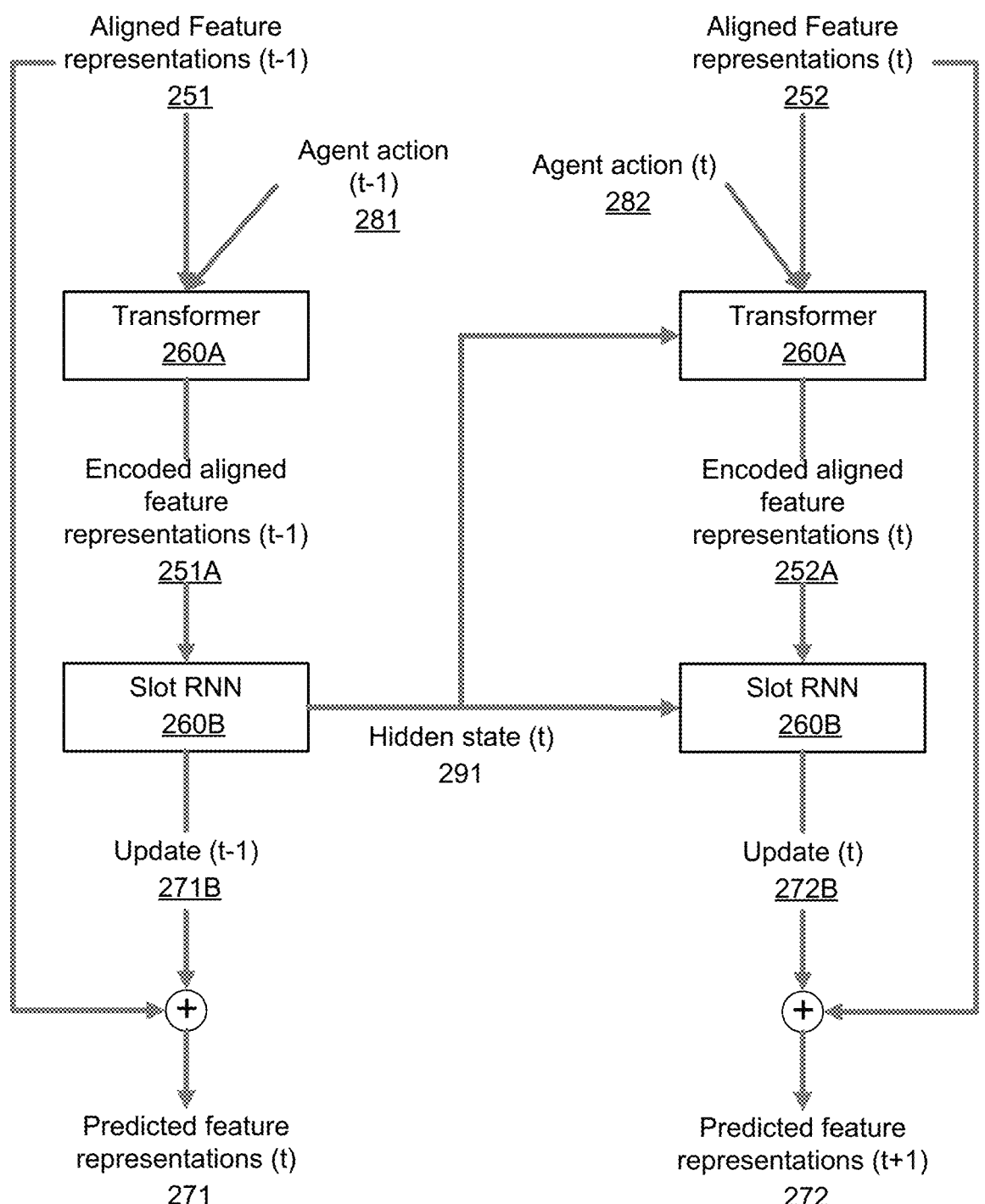
FIG. 2 illustrates an example process for using a transition neural network to generate predicted feature representation.

FIG. 2 illustrates an example process for using an example of the transition neural network to generate predicted feature representation.

As shown in FIG. 2, the system can use a transformer network 260A to process a set of aligned feature representations 252 at a current time point (t) and an agent action 282 at t. The aligned feature representations 252 correspond to a set of objects that are aligned with respect to a set of memory slots. The transformer network 260A can also receive as an input a hidden state 291 generated for the set of objects. The transformer network 260A can repeatedly apply a self-attention mechanism to the aligned feature representations 252, the hidden state 291, and optionally the agent action 282, and map the aligned feature representations 252 to the encoded aligned feature representations 252A. Examples of implementations of the transformer network are described in "Attention Is All You Need," Vaswani, et al., arXiv preprint, arXiv: 1706.03762, 2017.

The system uses the slot-specific RNN 260B to process the encoded aligned feature representation 252A at t corresponding to each slot and the hidden state 291 corresponding to that slot. The hidden state 291 has been generated by processing the encoded aligned feature representations 251A at a preceding time point t–1 using the slot-specific RNN 260B. The encoded aligned feature representations 251A at t–1 have been generated by processing aligned feature representations 251 at t–1 and the agent action 281 at t–1 using the transformer network 260A.

The RNN outputs an update 272B for each object at the current time point t. The system applies the update 272B to the aligned feature representation 252 at t to generate predicted feature representations 272 at the next time point t+1.

The aligned feature representation 252 at the current time point t can have been derived based on an observed image sequence, e.g., outputted by the alignment neural network 140 of FIG. 1. The aligned feature representation 252 also can have been feature representations predicted from a preceding time point, e.g., the predicted feature representations 271 computed by applying the update 271B computed at t–1 to the aligned feature representations 251 at t–1.

By repeatedly applying the process illustrated in FIG. 2, the system can predict feature representations for multiple time points beyond the last observation time point of the input image sequence. The predicted feature representations are aligned with respect to the memory slots by default, and do not need to be re-aligned when predicting for future time points.

Referring back to FIG. 1, in some implementations, the system 100 can output the predicted object feature representations as the transition prediction 170. In some implementations, the system can process the predicted object feature representations to generate predicted scene transitions in the image space as the transition prediction 170. For example, the system can use a decoder used by the decomposition neural network to process the predicted object feature representations to generate visualizations for the scene transition in the image space.

In some implementations, the system 100 can control the agent according to at least the output of the transition neural network 160. For example, the predicted feature representations, and/or predicted scene transitions at future time points, can be provided as an input to a control system configured to control the actions of the agent. The predicted feature representations can have been generated according to an observed image sequence up to the current time point and a planned action sequence (including actions planned for future time points) for the agent, and the predicted feature representations and/or predicted scene transitions indicate predicted consequences of the planned agent action sequence. The control system can determine, based on these predictions, whether or how to modify the planned action sequence to optimally perform a specified task. As previously mentioned, the agent can be a mechanical agent performing physical actions in a real-world environment. Using the transition prediction 170 to plan agent actions in the real world can potentially save time, reduce cost, and avoid dangerous and destructive scenarios. For example, the system can use a reinforcement-learning model to select actions for the agent to interact with the environment to achieve a specified result. Instead of relying on a large number of real-world interactions or computationally expensive simulated interactions, the system can use the predicted scene transitions to accelerate the learning of a policy for selecting the actions, e.g., by internally exploring future paths of the agent through state space that it has not experienced. In another example, the system can use the scene transition prediction as an additional input to an agent control model to plan the actions for the agent.

Prior to using the transition neural network 160 to predict future object representations, a training system, i.e., the same system as or a different system from the system 100, jointly trains the decomposition neural network 120, the alignment neural network 140, and the transition neural network 160 through unsupervised learning to minimize a joint loss, in order to cause the neural networks to accurately decompose and align objects from an input image sequence, and to accurately predict future transitions of the objects. The joint loss can include a loss term for each of the decomposition, alignment, and transition prediction processes. The system 100 may be trained end-to-end e.g. by backpropagating gradients of the joint loss through the system, and adjusting parameters of the neural networks e.g. by a gradient descent update rule.

For example, the joint loss can include an unsupervised decomposition loss measuring a difference between an input image and a reconstructed image based on object (segmentation) masks reconstructed by a decoder of the decomposition neural network 120. Examples of formulas for computing the unsupervised decomposition loss are described in "Monet: Unsupervised scene decomposition and representation," Burgess, et al., arXiv preprint arXiv: 1901.11390, 2019. There are many ways to use object (segmentation) masks to reconstruct an image; one example is described in Burgess et al. (ibid).

The joint loss can further include a transition loss that measures a difference between an output of the transition neural network 160 for a current time point t based on aligned feature representations at a preceding time point t−1 and aligned current feature representations outputted by the alignment neural network 160. In one example, the system can compute the transition loss as:

$$l_{Transition} = \sum_{t=1}^{T} \left\| z_t^d - z_t^a \right\|_2^2$$

where $$z_t^d$$

$\in \Re^{M \times F}$ are the predicted feature representations outputted from the transition neural network for the M memory slots for the time point t, and $$z_t^a$$

$\in \Re^{M \times F}$ are the aligned feature representations outputted from the alignment neural network for the M memory slots at the time point t. T is the total number of encoding and unroll steps.

The joint loss can further include an unsupervised alignment loss. The unsupervised alignment loss can include a reconstruction loss that measures a difference between an output of the transition neural network 160 predicted for the current time point t based on aligned feature representations at a preceding time point t−1 and "soft" aligned current feature representations generated by applying the adjacency matrix to a set of current feature representations. As described above, during training, the alignment can be a "soft" alignment, so the alignment loss is a differentiable function with respect to the output of the alignment neural network 140.

In some implementations, the unsupervised alignment loss further includes additional regularization terms, such as a term that measures an entropy of the alignment output, and/or a term that penalizes columns of the adjacency matrix that sum to more than one, assuming that the columns of the adjacency matrix are along the dimension of the object slots. In one example, the unsupervised alignment loss is computed as:

$$l_{Align} = \sum_{t=1}^{T} \left\| z_t^d - z_t^{a,soft} \right\|_2^2 + \psi \mathbb{H}(A_t) + \sum_{j=1}^{M} \max\left(0, \left(\sum_{k=1}^{K} A_{t,k,j} - 1\right)\right)$$

where $$z_t^{a,soft}$$

$\in \Re^{M \times F}$ are the soft aligned feature representations, $\mathbb{H}(\cdot)$ is an entropy operator that encourages values toward zero and one, $A_t \in \Re^{M \times K}$ is the adjacency matrix computed by the alignment neural network, and $\psi$ is a scaling parameter.

In some implementations, the unsupervised alignment loss and unsupervised transition loss can be computed over multiple time points, for example, for the observation time points in the input image sequence as well as for multiple prediction time points beyond the last observation time point.

Figure 3:
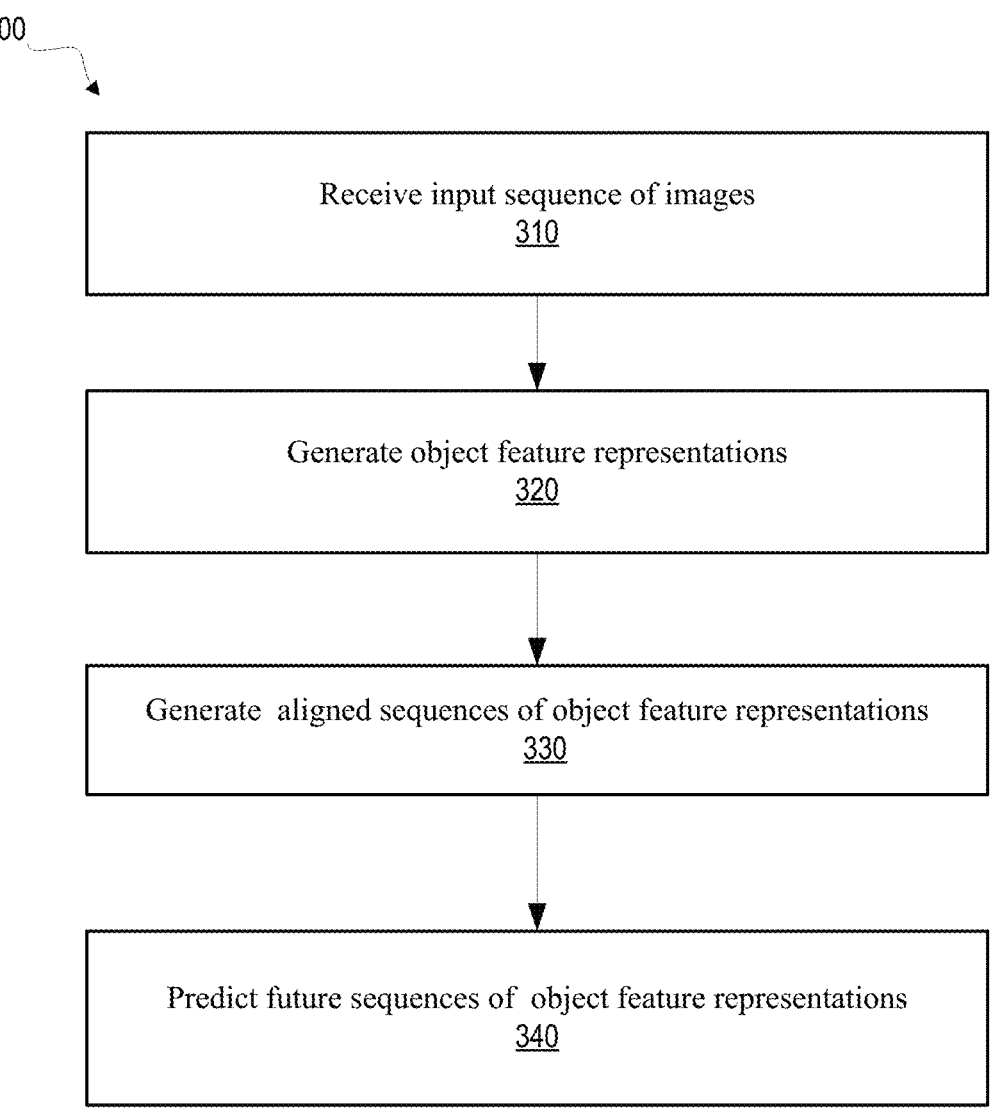
FIG. 3 is a flow diagram illustrating an example process for predicting scene transitions.

FIG. 3 is a flow diagram illustrating an example process 300 for predicting scene transitions. For convenience, the process 300 will be described as being performed by a system of one or more computers located in one or more locations. For example, a scene transition prediction system, e.g., the scene transition prediction system 100 of FIG. 1, appropriately programmed in accordance with this specification, can perform the process 300.

In step 310, the system receives an input sequence of images of a scene. Each image in the input sequence corresponds to a different time point in an observation time sequence.

In step 320, for each time point, the system processes the corresponding image using a decomposition neural network to generate one or more feature representations. Each feature representation represents one of a set of objects detected in the corresponding image.

In step 330, the system processes the feature representations for the time points using an alignment neural network to generate a set of aligned sequences of feature representations. Each aligned sequence of feature representations represents a same object across the different time points in the observation time sequence.

In some implementations, the system assigns the set of aligned sequences of feature representations respectively to a set of slots in a slot-based memory, i.e., a memory that has a plurality of "slots" and that stores data for each of the slots.

In step 340, the system processes the set of aligned sequences of feature representations using a transition neural network to predict, for each of the aligned sequences of feature representations, one or more feature representations that represent predicted features of the object represented by the aligned sequence at one or more successive time points.

In some cases, the agent interacting with the environment can be controlled to perform certain actions. One or more of the actions can affect the objects in the scene, such as moving the objects, or affect the viewing of the objects, such as a "head turn" (i.e. a change in image sensor gaze direction) leading to objects moving in and out of view. The system can apply the transition neural network on (i) the set of aligned sequences of feature representations generated from the input sequence of images and (ii) data identifying one or more actions taken (or to be taken) by the agent.

In some implementations, the transition neural network includes a recurrent neural network (RNN). For each aligned sequence of feature representations, the system processes, using the RNN, an RNN input derived based on the aligned sequence of feature representations, optionally the one or more actions taken by the agent, and a hidden state (i.e., an internal state of the RNN), to generate an update as the output of the RNN. For a successive time point after the current time point, the system generates a predicted feature representation for the successive time point by applying the update to the feature representation for the current time point.

In some implementations, prior to the RNN, the transition neural network further includes a transformer network. The transformer network is configured to process aligned object features corresponding to the set of detected objects at a given time point to generate encoded aligned object features that encode interaction among the set of objects. The system then uses the RNN to process the encoded aligned object features to predict the feature representations for future time points.

Figure 4:
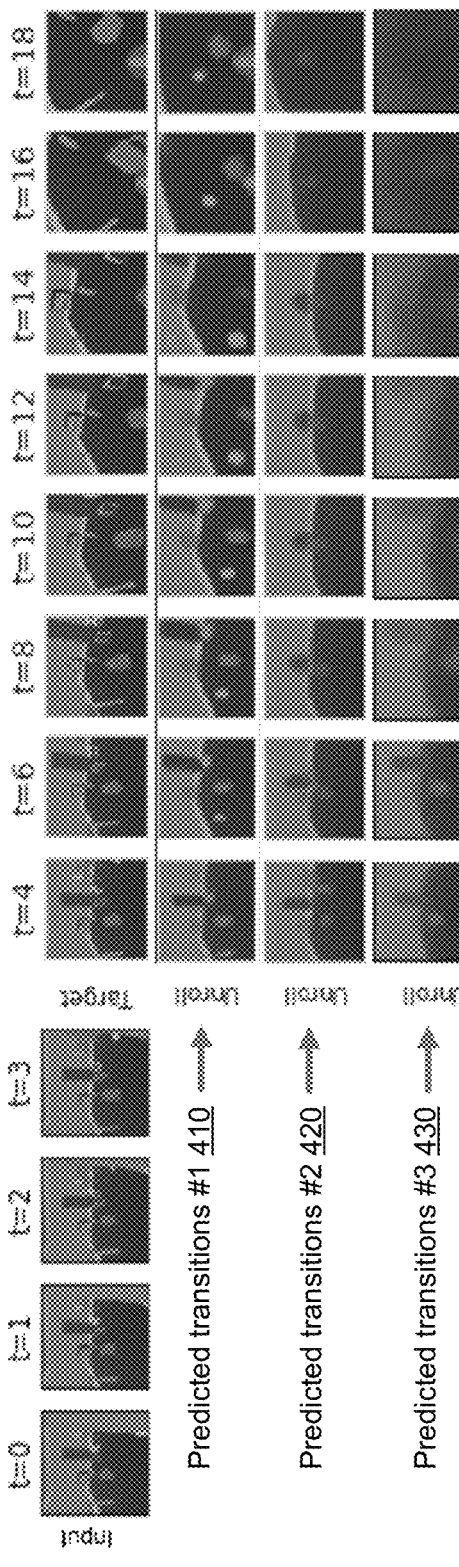
FIG. 4 shows a comparison of scene transition prediction results generated by different methods for a simulated 3D environment.

FIG. 4 shows a comparison of scene transition prediction results generated by different methods for a simulated 3D environment including multiple objects being interacted with by a simulated agent. A transition prediction system (e.g., the system 100 with reference to FIG. 1), performs unsupervised joint training of the decomposition neural network, the alignment neural network, and the transition neural network on an input image sequence having 4 time steps (t=0, 1, 2, 3). The system uses the trained transition network to predict object feature representations for 15 time steps (t=4–18), and processes the predicted object feature representations, using a decoder, to generate predicted scene transition images in the image domain, as shown by the first set of predicted transitions 410. Another system uses a decomposition neural network and a transition neural network to perform the prediction without aligning the object feature representations, and generates the second set of predicted transitions 420. A third system performs the current state-of-the-art model, as described in "Entity Abstraction in Visual Model-Based Reinforcement Learning," Veerapaneni, et al., arXiv preprint, arXiv: 1910.12827, 2019.

As shown by FIG. 4, the first system, in which the transition neural network has been trained jointly with the decomposition and alignment networks, significantly outperforms the other two systems, and accurately predicts scene transitions for future time steps, as shown by the comparison with the target scene transitions. By contrast, the second system (trained without alignments) and the third system (state-of-the-art method of Veerapaneni, et al.) generate predicted scene transitions with objects merging or fading into the background in a few time steps.

Figure 5:
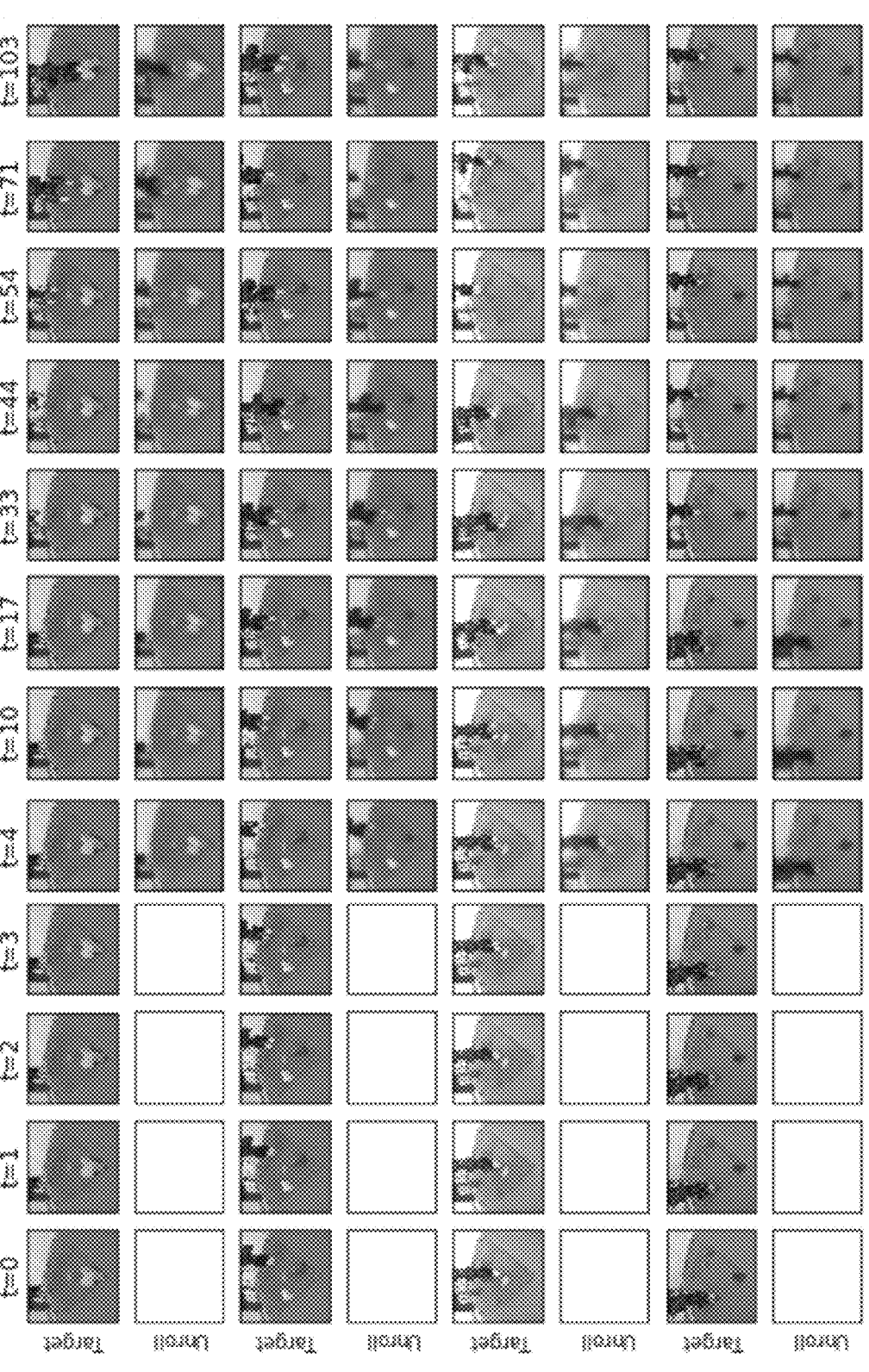
FIG. 5 shows examples of scene transition prediction results generated by a transition prediction system.

FIG. 5 shows examples of scene transition prediction results generated by a transition prediction system (e.g., the system 100 with reference to FIG. 1) based on real-world measurement data of a robot arm interacting with three colored objects of varying shapes and colors. The system performs unsupervised joint training of the decomposition neural network, the alignment neural network, and the transition neural network on the input sequence for 4 time steps (t=0, 1, 2, 3) and with additional 6 unroll steps.

As shown in FIG. 5, the system is capable of generating accurate scene transition predictions for significantly more steps (e.g., at least up to t=103) than those seen during training. Further, as shown in the 3rd example from the top, the system correctly predicts the reappearance of an object (in red) after it had been fully occluded at t=3 for 51 time-steps, reappearing fully at t=54 in both the prediction and the target frame. This demonstrates that the system is capable of predicting the reappearance of objects, even after long-term occlusion. This is because the system explicitly models the history of each object, and thus can accurately handle object persistence. This can be particularly useful for embodied agents that take actions in 3D as frequently, when the agent looks around, objects can move into and out of its field of view.

The results shown in FIGS. 4 and 5 demonstrate the superior performances of the described techniques compared with the current state-of-the-art technique.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving an input sequence of images of a scene, each image corresponding to a different time point in an observation time sequence;

for each time point, processing the corresponding image using a decomposition neural network to generate one or more feature representations, each feature representation representing one of a set of objects that appears in the corresponding image;

processing the feature representations for the time points using an alignment neural network to generate a set of aligned sequences of feature representations, wherein each aligned sequence of feature representations represents a same object across the different time points in the observation time sequence; and processing the set of aligned sequences of feature representations using a transition neural network to predict, for each of the aligned sequences of feature representations, one or more feature representations that represent predicted features of the object represented by the aligned sequence at one or more successive time points.

2. The method of claim 1, wherein the decomposition neural network, the alignment neural network, and the transition neural network have been jointly trained to minimize a joint loss.

3. The method of claim 2, wherein the joint loss includes an unsupervised decomposition loss measuring a difference between an input image and a reconstructed image based on object masks reconstructed by a decoder of the decomposition neural network.

4. The method of claim 2, wherein the joint loss includes a transition loss measuring a difference between an output of the transition neural network for a current time point based on aligned historical feature representations and aligned current feature representations outputted by the alignment neural network.

5. The method of claim 1, wherein:

the set of aligned sequences of feature representations are respectively stored in a set of slots in a slot-based memory.

6. The method of any one of claim 5, wherein the alignment network predicts an alignment output that defines an assignment for assigning current feature representations at a current time point to each of the set of slots in the slot-based memory.

7. The method of claim 6, wherein the alignment output includes an adjacency matrix for performing alignment of the current feature representations with the set of slots in the slot-based memory.

8. The method of claim 7, further comprising: performing a hard alignment by generating a permutation matrix based on the current feature representations and the adjacency matrix.

9. The method of claim 8, wherein the hard alignment is performed using a Hungarian algorithm.

10. The method of claim 8, wherein:

the set of aligned sequences of feature representations are generated by performing the hard alignment on the feature representations generated from the input sequence of images.

11. The method of claim 8, wherein the decomposition neural network, the alignment neural network, and the transition neural network have been jointly trained to minimize a joint loss, and the joint loss includes an unsupervised alignment loss, the unsupervised alignment loss including a reconstruction loss that measures a difference between an output of the transition neural network for the current time point based on aligned historical feature representations and aligned current feature representations generated by applying the adjacency matrix to the current feature representations.

12. The method of claim 11, wherein the aligned current feature representations are generated by performing a soft alignment that multiplies the adjacency matrix with the current feature representations.

13. The method of claim 11, wherein the unsupervised alignment loss further includes a measurement of an entropy of the alignment output.

14. The method of claim 11, wherein the unsupervised alignment loss further includes a measurement that penalizes columns of the adjacency matrix that sum to more than one.

15. The method of claim 1, wherein an environment corresponding to the scene is being interacted with by an agent.

16. The method of claim 15, wherein the input sequence of images of the scene are obtained by the agent.

17. The method of claim 15, wherein processing the set of aligned sequences of feature representations using the transition neural network includes:

generating aligned feature representations at a next time point by applying the transition neural network on (i) the set of aligned sequences of feature representations generated from the input sequence of images and (ii) one or more actions taken by the agent after the last time point in the observation time sequence.

18. The method of claim 17, wherein:

the transition neural network includes a recurrent neural network (RNN); and processing the set of aligned sequences of feature representations using the transition neural network includes:

for each aligned sequence of feature representations, processing, using the RNN, an RNN input derived based on the aligned sequence of feature representations, the one or more actions taken by the agent, and a hidden state, to generate an update; and for the next time point after the current time point, generating a predicted feature representation for the next time point by applying the update to the feature representation for the current time point.

19. The method of claim 18, wherein the set of aligned sequences of feature representations are respectively stored in a set of slots in a slot-based memory, and the RNN is a long short-term memory (LSTM) network applied independently to each slot and sharing weights between slots.

20. The method of claim 18, wherein:

the transition neural network further includes a transformer network, wherein the transformer network is configured to process the set of aligned sequences to generate a set of encoded aligned sequences of feature representations that encode interaction among the set of objects; and the RNN input includes the set of encoded aligned feature representations.

21. The method of claim 15, further comprising:

controlling the agent according to at least an output of the transition neural network.

22. A system comprising one or more computers and one or more storage devices storing instructions that when executed by the one or more computers cause the one or more computers to perform operations comprising:

receiving an input sequence of images of a scene, each image corresponding to a different time point in an observation time sequence;

for each time point, processing the corresponding image using a decomposition neural network to generate one or more feature representations, each feature representation representing one of a set of objects that appears in the corresponding image;

processing the feature representations for the time points using an alignment neural network to generate a set of aligned sequences of feature representations, wherein each aligned sequence of feature representations represents a same object across the different time points in the observation time sequence; and processing the set of aligned sequences of feature representations using a transition neural network to predict, for each of the aligned sequences of feature representations, one or more feature representations that represent predicted features of the object represented by the aligned sequence at one or more successive time points.

23. One or more non-transitory computer storage media storing instructions that when executed by one or more computers cause the one or more computers to perform operations comprising:

receiving an input sequence of images of a scene, each image corresponding to a different time point in an observation time sequence;

for each time point, processing the corresponding image using a decomposition neural network to generate one or more feature representations, each feature representation representing one of a set of objects that appears in the corresponding image;

processing the feature representations for the time points using an alignment neural network to generate a set of aligned sequences of feature representations, wherein each aligned sequence of feature representations represents a same object across the different time points in the observation time sequence; and processing the set of aligned sequences of feature representations using a transition neural network to predict, for each of the aligned sequences of feature representations, one or more feature representations that represent predicted features of the object represented by the aligned sequence at one or more successive time points.

* * * * *